Figures 1, 2:
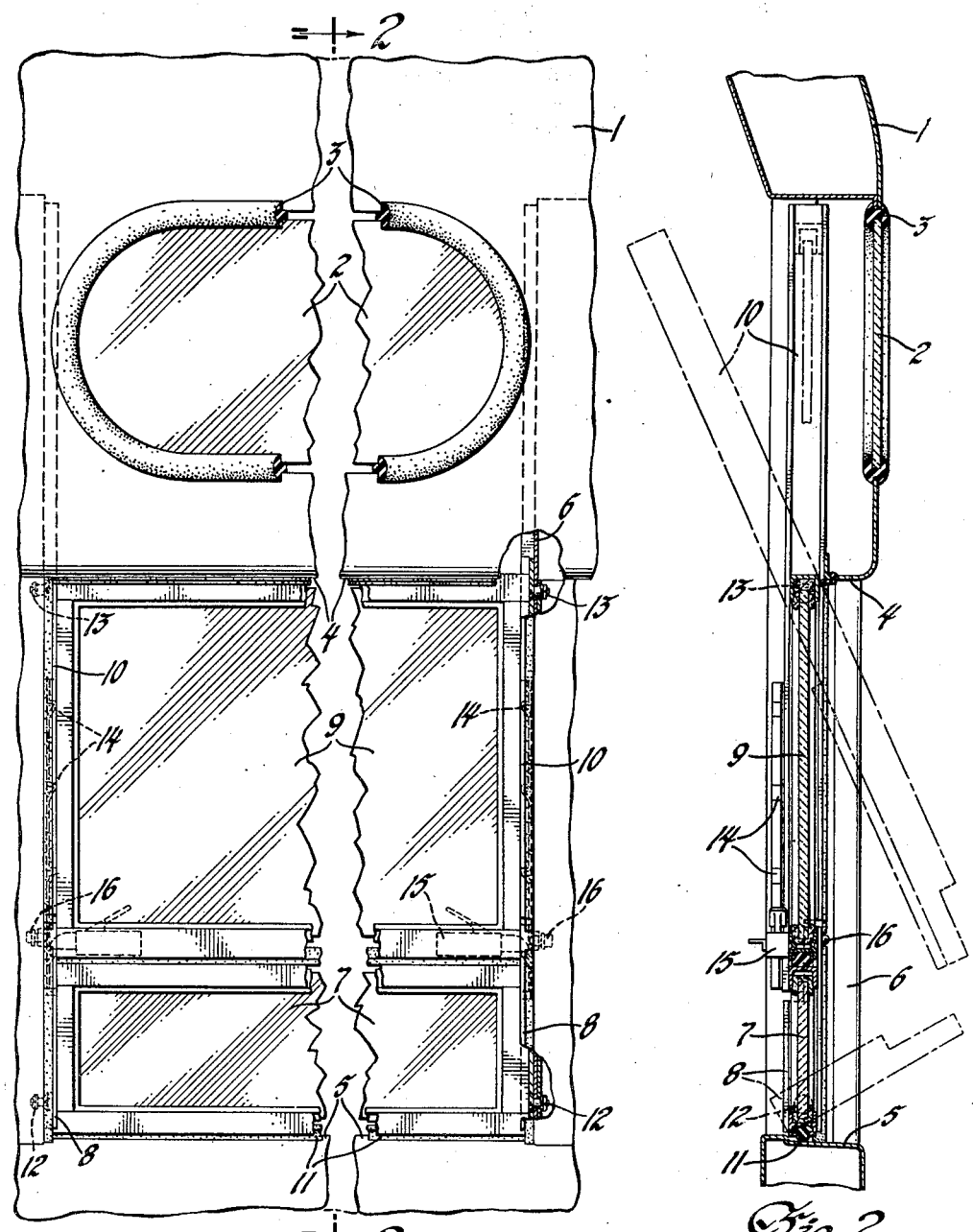

April 10, 1951 E. W. ALLEN 2,548,250
PUSH-OUT WINDOW

Filed Nov. 21, 1947 2 Sheets-Sheet 1

Inventor
Everett W. Allen
By
Spencer, Willits, Helwig, Baillio
Attorneys

April 10, 1951 E. W. ALLEN 2,548,250
PUSH-OUT WINDOW
Filed Nov. 21, 1947 2 Sheets-Sheet 2

Inventor
Everett W. Allen

By
Spencer, Willets, Helmig, Baillio
Attorneys

Patented Apr. 10, 1951

2,548,250

UNITED STATES PATENT OFFICE 2,548,250

PUSH-OUT WINDOW

Everett W. Allen, Birmingham, Mich., assignor to General Motors Corporation, Detroit, Mich., a corporation of Delaware Application November 21, 1947, Serial No. 787,424

9 Claims. (Cl. 189—64)

In addition to utility, durability, simplicity, low cost, appearance and other of the usual engineering design considerations the construction and operation of windows for rail cars, trolley and motor coaches need to take into consideration the requirements of various laws of federal, state and city governments and regulations of Government bureaus. The area, location, arrangement and operation of side wall windows and the matter of ventilation are all important factors with respect to the convenience and safety of passengers. While admitting light the vehicle windows fundamentally afford vision to the outside and particularly in the case of a city service vehicle enable the passengers to observe location and signal their destination. To avoid the complications of extremely large windows it is customary to provide a series of main windows at eye level of seated passengers and a series of auxiliary or transom windows at the higher eye level of passengers standing in the aisle. For warm weather ventilation windows are arranged to slide usually one behind the other without interfering with vision. Conveniently the main window is at seated passenger level and is slidable upwardly behind the standee or transom window and the latter preferably is fixed.

Among the various local requirements the use of guards are specified to discourage projection of passengers' arms through window openings and this requirement is sometimes satisfied by dividing the main window into a fixed lower portion and a slidable upper portion. Another situation deals with the use of the main window opening as an emergency exit and which must be large enough for a passenger to pass through it and the closure for such opening must be arranged so that it can be quickly dislodged to leave the opening unobstructed.

In order to provide a window construction for universal usage in various localities having different requirements is one of the objects of this invention and accordingly it is here proposed to have in each side wall of a passenger conveyance a longitudinal succession of small window openings at standee eye level and another longitudinal succession of relatively large window openings at seated passenger eye level, with each small opening closed by a fixed window and located directly above a large opening. Occupying and closing the lower portion of each large opening is a normally stationary part window with a slidable ventilating window closing the remainder of the large opening and being slidable between closed position in which its lower edge abuts the upper edge of the stationary lower window and an open position in which it extends behind and overlaps the wall containing the standee window and without interfering with the view through the window openings. For clearing the large opening for emergency exit use the normally stationary lower window is hinged near the sill and the guide channels for the lift window are hinged intermediate their length at the header margin of the opening so that regardless of the position of the lift sash both the lower window and the guide channels may be swung outwardly upon sufficient push thereon to clear or free the large opening completely of all obstruction for easy passenger exit.

Figure 3:
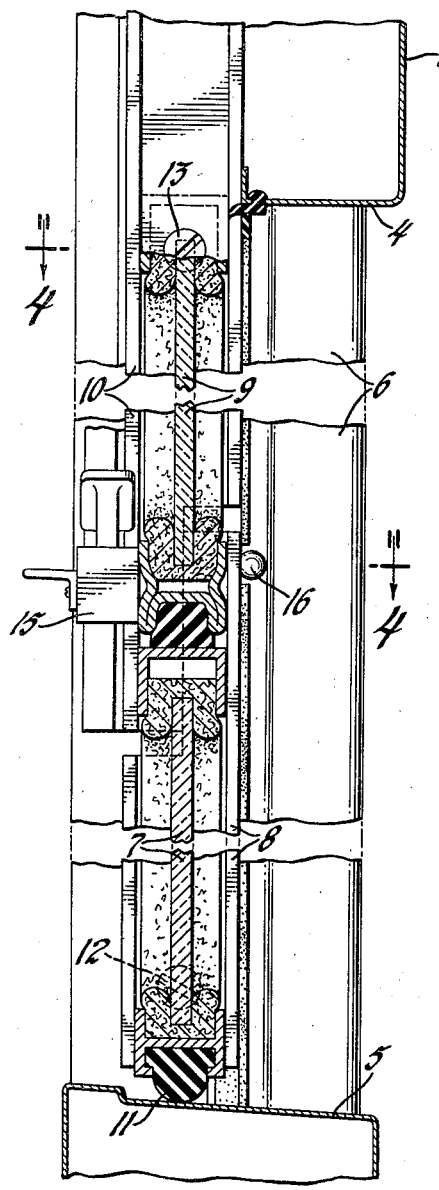
Figure 4:
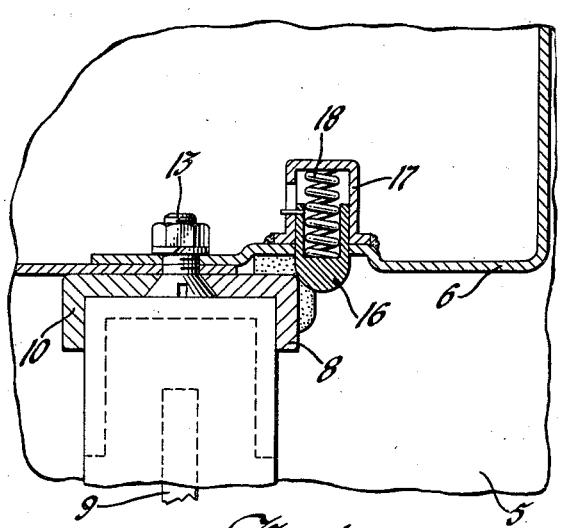
Figure 5:
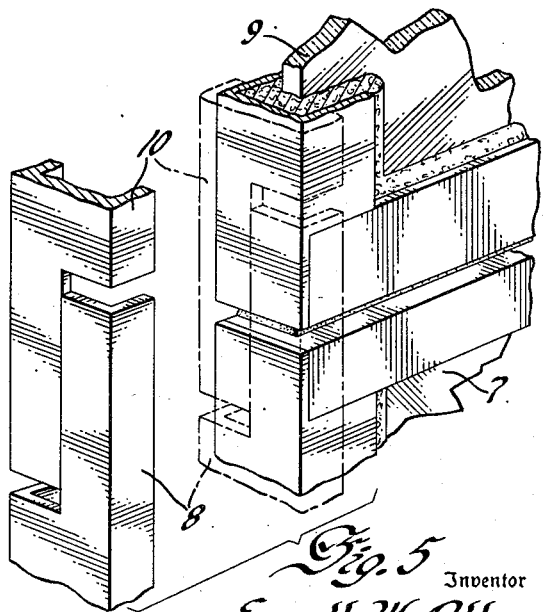

A more complete explanation of the structure will be given with reference to the accompanying drawing wherein Figure 1 is an elevation of a portion of a window side wall and window assembly with portions in section; Figure 2 is a vertical section on line 2—2 of Figure 1 and additionally shows by broken lines the sash assembly dislodged and in partially open position; Figure 3 is a vertical section like Figure 2 but on a much larger scale; Figure 4 is a detail section on line 4—4 of Figure 3 and Figure 5 is a perspective view illustrating the interfitting relation of the sash receiving channel mountings.

Referring to the drawing, the numeral 1 indicates the outside paneling or metal sheathing supported by spaced body posts to afford the body side wall having upper and lower observation openings therein. The upper opening is formed simply by punching or cutting out material from the wall sheathing and is closed by a fixed pane 2 of window glass held in place by a conventional rubber mounting strip 3 which straddles adjacent edges of the body panel and glass pane. The main window opening spaced below the standee window is defined at the top margin by an inturned header flange 4 and a lower sill 5 together with a pair of longitudinally spaced vertical posts 6. Its closure assembly includes a normally stationary lower window or sash assembly 7 with side mounting rails 8 therefor and the upper lift window or sash assembly 9 and guide mounting rails 10 therefor.

In general the window sashes illustrated are of conventional structure and may be variously modified except that the lower window and the guide for the lift sash should be hinged on horizontal axes near opposite ends of the window opening or adjacent the sill 5 and the header 4, for outward swinging displacement from the normal position illustrated by the full lines in the drawing to an open position substantially 90° from the full line position. In Figure 2 the broken lines indicate a partial displacement for convenience of illustration and it will be understood that such broken lines would extend horizontally in Figure 2 for illustrating the completely open emergency position.

In the existing arrangement the lower and normally stationary guard window 7 carries a rubber weather seal 11 in its lower sash rail to contact with the sill 5 and has its opposite side bars fixed within a pair of channel section mounting rails hinged at their lower ends by a pair of pivot studs 12 to the side posts 6. Similar hinge pins or studs 13 secure to the posts 6 near the header 4, the intermediate portions of the guide channels 10 in which the lift sash is slidable. It will be noted that from their midpoints of pivotal attachment the guides 10 extend in both directions with approximately half of their length behind and in overlapping relation with the side wall panel 1 containing the standee window 2 and the other half extending into the main window opening. On the inner side of the lower portion of the guide rails 10 are fastened retainers in the form of spaced ratchet stops 14 for selective engagement with the usual finger operated lock units 15 which hold the lift sash in any selected position to which it may be adjusted toward or from the closed position illustrated, in which its lower bar rests upon the upper bar of the lower sash.

As best seen in Figure 5 the adjacent ends of the upper and lower rails 8 and 10 interfit with each other as, for example, having cutouts or other suitable formations to overlap and interlock with one another. The outermost of the overlapping terminals is engaged in the normally closed position by the nose of a retractible latching plunger 16, as seen in Figure 4. This plunger is slidably pocketed within a housing 17 fixed on the post 6 with a spring 18 to yieldably project the plunger 16 into sash retaining position. The pressure of the spring 18 is selected so that the plunger normally will retain the rails 8 and 10 in interlocking relation but will yield when the ball nose on the plunger 16 is cammed inwardly to pass the rails upon an outward manual force thereon equivalent to about 150 pounds. Thus spring resistance to plunger adjustment precludes accidental window displacement but can be easily overcome by a passenger who desires to use the emergency exit. If desired an outside handle or finger piece may be added so as to enable the windows to be swung open from the outside.

I claim:

1. In a push out safety closure for an observation opening in a wall, a normally stationary window occupying and closing an end portion of said observation opening, a slidable window slidable between two extreme positions in one of which it occupies the remainder of said observation opening and completes the closure thereof and in the other of which positions it overlaps the wall immediately beyond the observation opening, a pair of guide rails slidably mounting the slidable window, hinge mountings carried by said wall at opposite ends of said observation opening, one for the normally stationary window and the other for said guide rails intermediate their ends and releasable latch means retaining the stationary window and guide rails in closure relation to said observation opening and operable to release the same for outward swinging about said hinge mountings to afford unobstructed clearance of the observation opening without regard to the position of the sliding window in its guide rails.

2. In combination, a wall having an opening, a pair of spaced apart guide rails overlapping a portion of the wall immediately beyond said opening and extending into the opening at the opposite sides thereof, hinge mountings pivoting said rails intermediate their length on the wall and adjacent one end of said opening, a closure element slidable on said rails between a position overlapping said wall and a position occupying a portion of said opening, and a non-slidable closure element normally occupying another portion of said opening and hingedly mounted on the wall adjacent the opposite end of said opening.

3. In a window structure of the type in which the lower part of the wall opening has a normally stationary window and the upper portion has a window which is slidable from the opening to an open position behind a portion of the wall adjacent said opening, means to enable both window assemblies to be moved clear of the opening for emergency exit use including a pivotal mounting carried by the wall for supporting the lower window on a transverse axis adjacent the sill, a pivotal mounting carried by the wall adjacent the header for supporting the sliding window and a push out operable latch retaining both windows in their normal relation to said opening.

4. In combination, a wall having a window opening, a lower normally stationary window, a pivot support connecting the wall and the window near its lower edge and at the window sill, a pair of guide rails extending behind the wall and into the opening for slidably mounting a slidable upper window, means pivotally mounting said rails on the wall at the window header and intermediate the rail end portions located respectively within the opening and behind the wall and a spring pressed retractible plunger releasably retaining said lower window and the guide rails against outward swinging.

5. An emergency safety exit ararngement, including a wall having an opening bounded at the bottom by a sill and at the top by a header and fitted with a window assembly, said assembly including a normally stationary lower window member pivotally mounted on the wall at its lower edge near the sill, a pair of normally stationary guide rail members slidably mounting a slidable upper window and having approximately half their length within the opening and the other half overlapping the wall beyond said opening, a pivotal mounting hingedly connected with the rail members about midway of their length and fixed to the wall at the header, with the lower end portions of the rail members in interfitted overlapping relation with the top of the lower window member, and a resilient latch releasably engaging one of said members for normally retaining said members in stationary relation and yieldable upon a substantial manual force exerted on any portion of the window assembly for outward swinging of the members to the respective pivotal mountings from the opening to clear the same.

6. In a push out safety closure for an opening, a wall containing the opening an outwardly swingable hinged but normally stationary closure for a part of said opening, a hinged connection between said closure and said wall, an outwardly swingable but normally stationary hinged support slidably mounting a closure for another part of said opening, a hinged connection between said support and said wall, and releasable latch means operative normally to retain said parts in closure relation to the opening.

7. In a passenger conveyance having a side wall, a stationary upper panel constituting a part of said wall, a normally stationary window also in said wall and spaced considerably below said upper panel, sliding window guide rails bridging the space between said window and said upper panel and overlapping at opposite ends with both the window and the panel, a normally slidable window mounted in said rails for adjustment between an open position in overlapping relation with the upper panel and a closed position in which its lower edge abuts the upper edge of the lower window and in which it cooperates with the lower window in completing a closure for a comparatively large opening in the conveyance side wall adjacent a passenger seat, a pair of hinged connections carried by the wall at opposite vertical extremities of said opening and respectively mounting said guides and said lower window for outward swinging from the wall to completely clear the opening of obstruction, and latch means yieldably retaining the guides and lower window in normally stationary relation.

8. In combination, a wall having an opening therein, a pair of windows arranged end to end to constitute a closure for said opening, a pivotal connection between the wall and one of said windows near one end of said opening, slide rails slidably mounting the other window and a pivotal connection between said rails at substantially half way between their opposite ends and the wall near the opposite end of said opening.

9. In combination, a slide track, a closure section slidably mounted by the track, a second closure section positioned beyond one end of the track for cooperative end to end relation with the first mentioned closure section, a wall having an opening to which said sections are fitted, a hinge connection between said second section and the wall at one end of the opening and a hinge connection between the slide track medially of its length and the wall at the opposite end of said opening.

EVERETT W. ALLEN.

REFERENCES CITED

The following references are of record in the file of this patent:

UNITED STATES PATENTS

| Number | Name | Date |
|---|---|---|
| 1,956,891 | Cadoret | May 1, 1934 |
| 2,405,394 | Austin | Aug. 6, 1946 |

FOREIGN PATENTS

| Number | Country | Date |
|---|---|---|
| 468,858 | France | 1914 |